United States Patent Office 3,321,337
Patented May 23, 1967

3,321,337
PROCESS FOR PREPARING BORON NITRIDE COATINGS
Robert J. Patterson, Dallas, Tex., assignor to Texas Instruments Incorporated, Dallas, Tex., a corporation of Delaware
No Drawing. Filed Dec. 12, 1963, Ser. No. 329,980
7 Claims. (Cl. 148—6.3)

The present invention relates to vapor phase deposition of boron nitride and more particularly, but not by way of limitation, relates to an improved atmospheric pressure process for the preparation of dense boron nitride coatings on electrically-conductive metals and the like to serve as electrical insulation.

In most processes used in the preparation of dense pyrolytic boron nitride a low pressure reactor system is used to achieve the deposition of boron nitride from the vapor phase by thermal decomposition reactions. The low pressure reactor systems are necessary in these processes because if the relatively unstable starting compounds are used in atmospheric pressure reactors, decomposition may occur a considerable distance from the heated metallic substrate, resulting in a powdery deposit. By reducing the pressure within the reactor, a longer mean free path of the gas molecules is provided thereby preventing contact with the hot surface before decomposition occurs so as to increase the density of the deposit. In addition to requiring relatively complex low pressure reactor systems to carry out the process, the resulting product is not of high quality in that the boron nitride deposits may not be of uniform density and sometimes do not readily adhere to the metal substrate.

Therefore, an object of the present invention is to provide a process for depositing a boron nitride coating on a metal substrate which may be carried out at atmospheric pressure, yet which will produce a boron nitride coating which is strongly adherent to the metal and which will be dense and well suited for insulating or other dielectric purposes.

Another object of the present invention is to provide a process for producing an improved boron nitride coating on a metal object.

Still another object of the present invention is to provide a process for applying a coating of dense boron nitride to a metal substrate which is a simple, inexpensive, one-step procedure.

Another object of the present invention is to provide a method for producing boron nitride coatings suitable for protecting metals operating at high temperatures for brief periods of time, for protection of chemical process reactor components, for linings for crucibles and boats used in metal evaporation, crystal growing, and glass fabrication as well as many other uses which will be evident to those skilled in the art.

A still further object of the present invention is to provide a simple and economical process for depositing a boron nitride dielectric coating over a metal object of substantially any shape.

In its broader aspects, the present invention entails heating the metal surface in the presence of ambient hydrogen gas and in the presence of vapors which will produce boron nitride deposits as a result of thermal decomposition. The ambient hydrogen gas activates the heated metal surface during the initial stages of the boron nitride deposition so as to cause the formation of a metal boride layer which may be considered to act as a bonding agent for adhering the boron nitride to the metal substrate material. In particular, the process contemplates heating the metal substrate and passing hydrogen containing small amounts of trichloroborazole over the substrate. The substrate may be practically any refractory metal and coatings have been successfully applied to niobium, tantalum, molybdenum, tungsten, titanium and some alloys such as those containing iron and chromium.

The method of the present invention is carried out by placing the metal object upon which the boron nitride coating is to be deposited in a chamber from which air or any other detrimental ambient has been removed. The metal substrate is then heated by any suitable method, such as electrical resistive heating, to a temperature within the range from 700°–1300° C., and preferably in the range from 1150°–1200° C.

A stream of hydrogen containing small amounts of trichloroborazole at atmospheric pressure is passed over the heated metal substrate. The presence of the hydrogen initially causes a metal boride film over the entire surface of the metal substrate. After the boride film has covered the surface, the hydrogen is no longer a factor in the process and the trichloroborazole continues to undergo thermal decomposition and deposits a coat of boron nitride on the substrate until the desired thickness is achieved. Boron nitride coatings ranging from 5 microns to 100 mils in thickness have been achieved.

The hydrogen-trichloroborazole mixture may be obtained by passing hydrogen through or across a bed of solid trichloroborazole contained in a Pyrex vessel. The solid trichloroborazole may be heated or even liquefied according to the concentration of trichloroborazole desired in the hydrogen. Higher temperatures increase the concentration of trichloroborazole and thereby increase the rate of deposition on the substrate. As the rate of deposition increases, a slight decrease in the density of the boron nitride coating may be experienced.

The process is particularly adaptable to substrate metals that are stable in hydrogen at elevated temperatures such as molybdenum and some alloys. However, some metals such as tantalum tend to embrittle in hydrogen so that the substrate cannot be initially heated to the operating temperature in the hydrogen atmosphere. In such a case the metal substrate may be first heated in an inert ambient, such as helium or nitrogen, and then be exposed to the hydrogen-trichloroborazole vapor stream after the operating temperature is reached. In this case, an adherent boron nitride coating will form very quickly without embrittlement of the substrate and will thereafter serve to protect the substrate from further interaction with the hydrogen. Since the presence of hydrogen is necessary only during the initial stage of deposition in order to product a metal boride film, it will be appreciated that a gas other than hydrogen may be used to carry the trichloroborazole after the initial stages of the deposition process.

As an example of the process, a boron nitride coating was applied to a 0.010 inch diameter molybdenum wire substrate. The wire substrate was raised to a temperature of 1150°–1200° C. by electrical resistive heating. The hydrogen was passed over trichloroborazole at a temperature of 58° C. and having a calculated vapor pressure of 3 mm. Hg. The hydrogen flow was at a rate of 1–2 liters/minute so as to provide a calculated contact time of 30–60 seconds. A calculated deposition rate of 5 mils/hour was achieved. Several typical coatings prepared by the process conditions given above were tested to demonstrate flexibility and electrical insulation properties. A coated wire which could be bent on a diameter of ¼ inch had a voltage breakdown point of 250 volts D.C. A coated wire having a permissible bend diameter of ½ inch had a voltage breakdown point of 1100 volts D.C., and a coated wire having a permissible bend of 1 inch had a voltage breakdown point of 1400 volts D.C.

Due to the strong adhesion achieved by the above described process, the resulting flexibility, and the inherently high insulating qualities of uncontaminated dense boron nitride, the coatings applied by means of the present invention are highly useful for insulating wires, sheets and plates. Good coverage of all exposed surfaces of substrates having various geometrical configurations can be attained. The boron nitride coatings are also useful for protecting metals operating at high temperatures for short durations, for protecting chemical process reactor components, for linings for crucibles and boats used in metal evaporation, and for crystal growing and glass fabrication.

From the above detailed description, it will be evident to those skilled in the art that a novel and highly useful process for the preparation of boron nitride coatings on metal objects has been disclosed. Although a preferred embodiment of the invention has been described, it is to be understood that various changes, substitutions, and alterations can be made therein without departing from the spirit and scope of the invention as defined by the appended claims.

What is claimed is:

1. A process for applying at substantially atmospheric pressure a dense, adherent boron nitride coating to the surface of a refractory metal object stable in hydrogen at elevated temperatures comprising the steps of:
    (a) heating the refractory metal object to a temperature in the range of from 700° to 1300° C. in a hydrogen ambient,
    (b) passing a stream of hydrogen containing a small amount of trichloroborazole vapor over the refractory metal object until a film of refractory metal boride has formed on the exposed surface of the metal object, and
    (c) passing trichloroborazole in a carrier gas stream over the refractory metal object until a boron nitride coating of the desired thickness is deposited on the refractory metal boride film.

2. A process for applying at substantially atmospheric pressure, a dense, adherent boron nitride coating to the surface of an object composed of a metal taken from the group consisting of molybdenum, niobium, titanium, tungsten, and alloys thereof comprising the steps of:
    (a) heating the object to a temperature in the range of from 700° to 1300° C. in hydrogen ambient,
    (b) passing a stream of hydrogen containing a small amount of trichloroborazole vapor over the refractory metal object until a film of refractory metal boride has formed on the exposed surface of the object,
    (c) passing trichloroborazole in a carrier gas stream over the refractory metal object until a boron nitride coating of the desired thickness is deposited on the refractory metal boride film.

3. A process for applying at substantially atmospheric pressure a dense, adherent boron nitride coating to the surface of an object consisting essentially of molybdenum, comprising the steps of:
    (a) heating the object to a temperature in the range of from 700° to 1300° in a hydrogen ambient,
    (b) passing a stream of hydrogen containing a small amount of trichloroborazole vapor over the object until a film of molybdenum boride has formed on the exposed surface of the object,
    (c) passing trichloroborazole in a carrier gas stream over the object until a boron nitride coating of the desired thickness is deposited on the molybdenum boride film.

4. A process for applying at substantially atmospheric pressure a dense adherent boron nitride coating to the surface of a refractory metal object which tends to embrittle in hydrogen comprising the steps of:
    (a) heating the refractory metal object to a temperature in the range of from 700° to 1300° C. in an inert ambient,
    (b) passing a stream of hydrogen containing a small amount of trichloroborazole vapor over the refractory metal object until a film of refractory metal boride has formed on the exposed surface of the refractory metal object, and
    (c) passing trichloroborazole in a carrier gas stream over the refractory metal object until a boron nitride coating of the desired thickness is deposited on the refractory metal boride film.

5. A process for applying at substantially atmospheric pressure a dense, adherent boron nitride coating to the surface of an object consisting essentially of tantalum, comprising the steps of:
    (a) heating the object to a temperature in the range of from 700° to 1300° C. in an inert ambient,
    (b) passing a stream of hydrogen containing a small amount of trichloroborazole vapor over the object until a film of tantalum boride forms on the exposed surface of the metal object, and
    (c) passing trichloroborazole in a carrier gas stream over the object until a boron nitride coating of the desired thickness is deposited on the tantalum boride film.

6. The method of claim 4 wherein the carrier gas of step (c) is an inert gas.

7. In a process for applying at substantially atmospheric pressure a dense, adherent boron nitride coating to the surface of a refractory metal object, the step of passing a stream of hydrogen containing a small amount of trichloroborazole vapor over the refractory metal object heated to a temperature in the range of from 700° to 1300° C. until a film of refractory metal boride has formed on the exposed surface of the metal object.

References Cited by the Examiner

UNITED STATES PATENTS

| 1,023,485 | 4/1912 | Thowless | 117—106 |
| 2,823,151 | 2/1958 | Yntema et al. | 148—6.3 X |
| 2,844,492 | 7/1958 | Fitzer | 117—106 |

FOREIGN PATENTS

| 851,208 | 10/1960 | Great Britain. |
| 908,860 | 10/1962 | Great Britain. |

ALFRED L. LEAVITT, *Primary Examiner.*

J. R. BATTEN, JR., *Assistant Examiner.*